Oct. 23, 1962     L. F. URRY     3,060,254
BONDED ELECTRODES
Filed Aug. 3, 1959
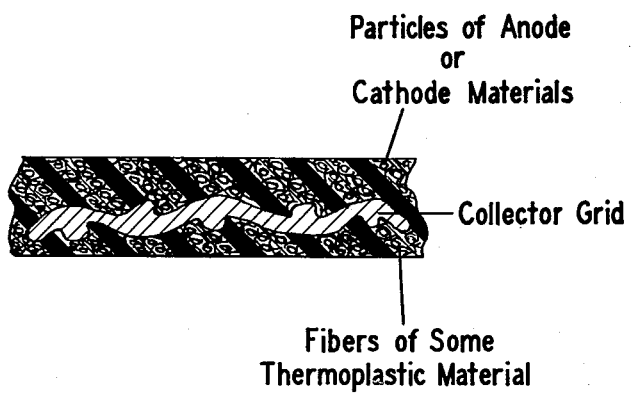
Particles of Anode or Cathode Materials
Collector Grid
Fibers of Some Thermoplastic Material
INVENTOR.
LEWIS F. URRY
BY
ATTORNEY United States Patent Office 3,060,254
Patented Oct. 23, 1962

3,060,254
BONDED ELECTRODES
Lewis F. Urry, Parma, Ohio, assignor to Union Carbide
Corporation, a corporation of New York
Filed Aug. 3, 1959, Ser. No. 831,402
1 Claim. (Cl. 136—24)

This invention relates to galvanic cell electrodes using binders composed of fibers of thermoplastic materials.

Plastic-bonded electrodes have been described and employed for some time; in prior applications the plastic binder has been used in powder form. In such applications, the plastic powder is mixed with active materials, and the mixture formed to a desired shape with pressure and heat. Generally, plastic powders are not very satisfactory as binders for electrochemically active materials for various reasons. To weld together, plastic particles must touch so that a high portion of the cathode volume must be devoted to the plastic. This requirement not only greatly reduces the amount of useful active components in the electrode, but also means that the active material is so well sealed with plastic as to be practically impervious to electrolyte. As a result, the electrolyte path to the active particles is so restricted that the electrodes can support only light drains.

It is particularly important in heavy duty cells that a minimum of binder material be employed so that the amount of useful active component may be as great as possible and that the electrolyte path therein not be restricted.

In the case of rechargeable cells, and especially in those intended for heavy duty use, to consider another instance, it is necessary that the electrodes be resistant to fractures, spalling or disintegration during the expansion and contraction associated with the charge-discharge cycles. During these volume changes there is a tendency for many binders to lose their binding properties.

It now has been discovered in accord with the present invention that the prior art deficiencies of plastic bonded electrodes can be substantially eliminated by using thermoplastic binders in fibrous form.

The main object of the present invention then is to provide means for incorporating a thermoplastic binder capable of providing a maximum of binding effect with a minimum quantity of a binder.

An equally important object of the present invention is to provide electrodes physically capable of withstanding the rigors of repeated charge-discharge cycling.

The present invention is illustrated by a single FIGURE, which is a fragmentary view of a flat plate electrode fabricated in accord with the invention showing electrochemically active particles distributed among thermoplastic fibers.

The present invention includes the blending of a thermoplastic fibrous material with dry anodic or cathodic particles. The thus-formed blend is subsequently shaped to produce electrodes having the desired geometry by placing the blend on a metallic current collector which may be a screen, expanded grid or other suitable supporting structure. This structure is then compacted under pressure and heated to the softening point of the plastic so that the fibers become interlocked and welded to each other and to the current collector, forming a durable network which holds in place the dry active component particles.

Fibrous plastic materials suitable for the purposes of the present invention are those thermoplastic materials which are stable in the cell environment and are capable of thermoplastically binding active materials. Vinyl chloride-vinyl acetate copolymers containing from 80 percent to 96 percent of vinyl chloride having a softening point of about 120° C., and marketed under the name "Vinyon HH," as well as copolymers of vinyl chloride and acrylonitrile, are suitable.

Generally, the fibers suitable for use in the invention should have a length considerably greater than their diameter, the length being considerably greater than that of conventional granules or powders. The filaments or fibers need not be woven, that is, they need not be twisted, piled up or converted to fabric form. The fibers may have a diameter of between 0.005 to 0.01 inch, and a minimum length of 1/16 inch. Their maximum length should be as great as possible, commensurate with the problem of handling the material in the mix, and may extend up to about 1/2 inch.

The proportion of plastic binder in the mix may vary over a wide range, as long as a sufficient amount thereof is present to provide binding forces. The maximum amount employed is primarily dictated by cost, handing problems, and performance desired.

The electrodes of the invention comprise from about 5 to about 25 percent by volume (about 1.0 to about 7.0 percent by weight) of thermoplastic fibers, from about 70 to about 95 percent by weight of active materials, up to about 20 percent by weight of an inert conductive material such as graphite, up to about 5 percent by weight of conductive filamentary material, and up to about 2 percent by weight of carboxymethylcellulose or other similar cellulosic derivative. The selected mixture, together with a suitable metallic current collector, is placed in a mold. The mold and its contents are heated to the softening point of the plastic fibers to effect bonding by interlocking and welding the fibers. Pressure is applied in the range of up to 5 tons per square inch to compact the electrode components.

An example of a typical cathode formulation containing manganese dioxide as the depolarizer is as follows:

*Formula 1*

| | Percent by weight |
|---|---|
| $MnO_2$ | 71.86 |
| Steel wool | 4.07 |
| Graphite | 17.97 |
| "Vinyon HH" fibers (1/8 inch long) | 6.10 |
| | 100.00 |

Another example of a suitable cathode formulation employing mixed manganese dioxide-mercuric oxide depolarizer and designed for use in rechargeable cells, is as follows:

*Formula 2*

| | Percent by weight |
|---|---|
| Mixed depolarizer, 50% by volume: | |
| HgO and $MnO_2$ | 82.7 |
| Graphite | 9.6 |
| Steel wool fibers | 3.44 |
| "Vinyon HH" fibers | 4.26 |
| | 100.00 |

The following is an example of a cathode formulation from which the filamentary conductive material has been omitted. This electrode formulation is suitable for use either in alkaline or acid electrolyte.

*Formula 3*

| | Percent by weight |
|---|---|
| $MnO_2$ | 76.9 |
| Graphite powder | 19.3 |
| "Vinyon HH" fibers | 3.8 |
| | 100.0 |

An example of an anode formulation utilizing zinc is as follows:

Formula 4

| | Percent by weight |
|---|---|
| Zn powder, 4% amalgamated | 41.98 |
| ZnO | 51.24 |
| Carboxymethyl cellulose | 1.65 |
| "Vinyon HH" fibers (approximately ⅛ long) | 4.13 |
| HgO | 1.00 |
| | 100.00 |

The plastic fiber bonding of the subject invention has made possible the construction of rechargeable cathodes and anodes for alkaline systems which withstand as many as 40–60 charge-discharge cycles in contrast to the same electrodes made by other techniques which failed after several cycles. Cement-bonded cathodes in conjunction with cadmium anodes began to deteriorate after 17 cycles, whereas the fiber-bonded cathodes still exhibited excellent service properties after 60 cycles. Similar improvements have been observed with fiber-bonded anodes in accord with the invention.

Plastic fiber-bonded plate cathodes and anodes of the invention may be employed in the construction of nickel-cadmium cells. Production of cells giving exceptionally high performance per unit volume is thus possible at a much lower cost than is presently involved in the production of the sintered plates used in currently available nickel-cadmium cells.

An example of a cadmium anode formulation is an follows:

Formula 5

| | Percent by weight |
|---|---|
| Powdered cadmium | 41.9 |
| CdO | 45.0 |
| Carboxymethyl cellulose | 1.4 |
| FeO | 8.3 |
| "Vinyon HH" fibers | 3.4 |
| | 100.0 |

An example of a nickel oxide cathode formulation is as follows:

Formula 6

| | Percent by weight |
|---|---|
| Ni(OH)$_2$ | 70.08 |
| Graphite | 20.24 |
| Steel wool fibers | 4.57 |
| "Vinyon HH" fibers | 5.11 |
| | 100.00 |

The following is an example of a nickel oxide cathode from which both steel wool fibers and graphite have been omitted.

Formula 7

| | Percent by weight |
|---|---|
| Ni(OH)$_2$ powder | 45.4 |
| Nickel powder, finely divided | 51.3 |
| "Vinyon HH" fibers | 3.3 |
| | 100.0 |

The next formulation illustrates an electrode containing finely divided mercuric oxide and using silver powder as the inert carrier material. The electrode, if desired, can be supported on a 0.003 inch thick plate. The suitable range of constituents is:

| | Percent by weight |
|---|---|
| Mercuric oxide | 60 to 80 |
| Silver | 20 to 35 |
| "Vinyon HH" fibers | 1 to 7 |

A preferred specific formulation is:

| | Percent by weight |
|---|---|
| Mercuric oxide | 65.1 |
| Silver | 32.7 |
| Fibers | 2.2 |

In addition to being used in rechargeable systems such as manganese dioxide-zinc, mercury-zinc, nickel-cadmium and silver oxide-zinc cells, the subject invention permits a practical exploitation of the "Drumm storage cell" system (nickel oxide-zinc). The latter system is advantageous because of its high voltage (1.86 v. open circuit compared to 1.35 v. of the nickel-cadmium cell) and of its resultant power gain.

The following data will highlight the performance of the present electrodes. A rechargeable alkaline manganese dioxide-zinc cell composed of two fiber-bonded positive plates and three fiber-bonded negative plates was assembled. The plates consisted of 8.2 grams of a mix containing 10:1 weight ratio of manganese dioxide: graphite per 2.91 x 3.63 x .030 inch expanded nickel screen plate with 0.3 g. of fibers. When on a 4 ohm drain the cell gave 280 milliamperes at 1.20 volts. Its performance was essentially unchanged after ten discharge cycles.

Another primary cell construction containing two fiber-bonded manganese dioxide cathodes and three sheet zinc anodes in a Le Clanche system was compared with the performance of a standard Le Clanche cell of similar volume. Its short circuit amperage was 40 amperes; that of the standard cell was only 12 to 14 amperes. The service in minutes under 0.5 ohm was 40 minutes for the cell containing fiber-bonded electrodes and 8 for the standard.

A capacity comparison between a fiber-bonded cadmium anode and a commercially available cadmium anode of the same size consisting of sintered plaques impregnated with cadmium oxide demonstrated the superiority of the former. Thus a fiber-bonded cadmium anode 0.03 x 2.91 x 3.63 inches gave 3.96 ampere hours per cubic inch, whereas the commercial anode of the same size gave only 2.27 ampere hours per cubic inch.

Since the general requirements of acid electrolyte systems are similar to alkaline electrolyte systems, the fibrous binders of the subject invention may also be employed in rechargeable acid systems, e.g., in the lead-sulfuric acid system or to permit production of a rechargeable Le Clanche cell.

The cathode cakes made with fibrous binders are strong, elastic and capable of withstanding severe expansion-contraction cycling. Their flexibility is such that they can be severely deformed without cracking. They may be rolled up or fabricated in tubular form in addition to the flat form illustrated. Further, these cathodes do not require setting period as where cement binders are used, and the mix can be stored indefinitely prior to use. Many solid depolarizers such as manganese dioxide and nickelous oxide may be incorporated into thin, high surface area units through the use of these binders, provided the depolarizer does not react with the plastic at molding temperatures of the cathode.

Where the electrochemically-active material is zinc, the fibrous support structure provided by the present invention serves to hold the zinc oxide in place as it forms, and to prevent settling out of the spongy electrolytic zinc formed when the cell is recharged. Such anodes are considerably more flexible and more capable of supporting heavy drains than those made by prior techniques. Since both anode and cathode materials are handled dry, finished electrodes made in accord with the invention can be stored over long periods without deterioration.

What is claimed is:

A shaped electrode composed of electrochemically reactive particles bonded by, and distributed among, fibrous thermoplastic material, which electrode is made by the process comprising blending said reactive particles together with said fibrous thermoplastic material, shaping and compacting the resultant blend to form the electrode, and heating the formed electrode to the softening point of said fibrous thermoplastic material whereby the individual fibers thereof become interlocked and welded together providing a durable network for holding said reactive particles in place throughout said electrode.

References Cited in the file of this patent

UNITED STATES PATENTS

| | | |
|---|---|---|
| 2,610,220 | Brennan | Sept. 9, 1952 |
| 2,627,531 | Vogt | Feb. 3, 1953 |
| 2,694,743 | Ruskin et al. | Nov. 16, 1954 |
| 2,708,683 | Eisen | May 17, 1955 |
| 2,794,845 | Grabe | June 4, 1957 |
| 2,902,530 | Eisen | Sept. 1, 1959 |